(12) United States Patent
Bosen et al.

(10) Patent No.: US 10,161,469 B1
(45) Date of Patent: Dec. 25, 2018

(54) SLOT EXPANDING ENERGY ATTENUATOR

(71) Applicant: Armorworks Holdings, Inc., Chandler, AZ (US)

(72) Inventors: David A. Bosen, Tempe, AZ (US); Ken-An Lou, Phoenix, AZ (US)

(73) Assignee: Armorworks Holdings, Inc., Chandler, AZ (US)

( * ) Notice: Subject to any disclaimer, the term of this patent is extended or adjusted under 35 U.S.C. 154(b) by 12 days.

(21) Appl. No.: 15/729,377

(22) Filed: Oct. 10, 2017

(51) Int. Cl.
| | |
|---|---|
| *F16M 13/00* | (2006.01) |
| *F16F 7/12* | (2006.01) |
| *B60N 2/42* | (2006.01) |
| *B63B 29/04* | (2006.01) |
| *B64D 11/06* | (2006.01) |
| *B60N 2/427* | (2006.01) |

(52) U.S. Cl.
CPC ............ *F16F 7/123* (2013.01); *B60N 2/4242* (2013.01); *B60N 2/42709* (2013.01); *B63B 29/04* (2013.01); *B63B 2029/043* (2013.01); *B64D 11/0619* (2014.12)

(58) Field of Classification Search
CPC ................ B60N 2/42709; B64D 11/0619
See application file for complete search history.

(56) References Cited

U.S. PATENT DOCUMENTS

| | | | | |
|---|---|---|---|---|
| 7,770,391 B2 * | 8/2010 | Melz | ..................... | F03G 7/065 |
| | | | | 292/340 |
| 9,512,868 B2 * | 12/2016 | Stempniewski | ...... | F16B 13/065 |
| 9,739,574 B1 * | 8/2017 | Vijay | ..................... | F41H 11/18 |

* cited by examiner

*Primary Examiner* — Amy J. Sterling
(74) *Attorney, Agent, or Firm* — James L Farmer (57) ABSTRACT

Methods and apparatus are provided for a shock attenuation device configured for use in conjunction with a body movably mounted to a structure along a stroking direction to attenuate shock loads associated with a high energy impact event on the structure. The device includes an elongated metal frame with left and right sides symmetrically disposed about a longitudinal slot extending from proximate a first end of the frame to a second end. The frame is mountable to one of the body and structure in an orientation causing the longitudinal slot to align with the stroking direction. A mandrel mountable to the other one of the body and structure is positioned in the frame at one end of the slot. The mandrel has width and length dimensions measured in the plane of the frame, wherein a maximum width of the mandrel is greater than a width of the slot.

33 Claims, 5 Drawing Sheets

SLOT EXPANDING ENERGY ATTENUATOR

TECHNICAL FIELD AND BACKGROUND

The technical field of the present invention relates to energy attenuation technology for reducing the severity of shock loads experienced by an object or person during a high energy impact event. The technical field may further relate to the incorporation of such technology in land vehicle, watercraft, and aircraft seating systems.

DESCRIPTION OF THE EMBODIMENTS

The instant invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
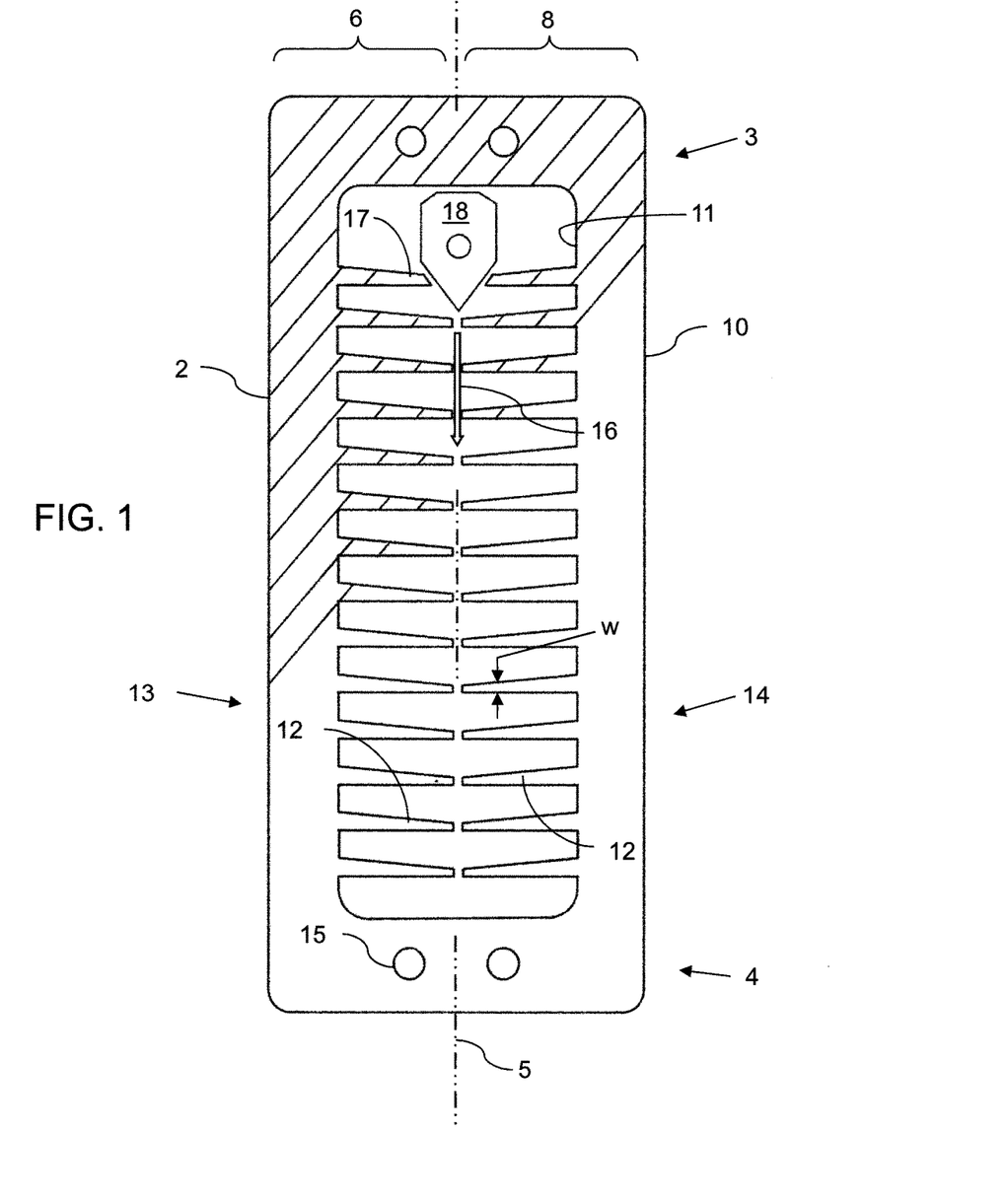
FIG. 1 is a plan view of an exemplary slot expanding energy attenuator with juxtaposed left and right combs defining a longitudinal slot, and a mandrel in a starting position.

An exemplary slot expanding energy attenuating ("EA") mechanism or device in accordance with the present disclosure is indicated generally at reference numeral 1 in the drawing Figures. Referring initially to FIG. 1, the EA device comprises an elongated metal frame 2 with an upper end 3, a lower end 4, and a slot 16 along a principal, or longitudinal axis 5 symmetrically dividing the frame into left and right halves 6, and 8. Frame 2 may have a rectangular shape as shown, bounded by a rectangular outside edge 10, and a defined thickness measured in a direction perpendicular to the plane of FIG. 1.

In one embodiment the slot 16 is defined by inside edges 11 of the left and right frame halves. In another embodiment the slot is defined by two rows of regularly spaced integral cantilevered beams, or teeth 12 that project from the inside edges 11 toward the longitudinal axis 5, and along with the left and right halves of the frame effectively define juxtaposed left and right combs 13 and 14. The teeth 12 may be arranged symmetrically so that every tooth on the left comb 13 lines up with a corresponding tooth on the right comb 14. The teeth on both sides may stop short of longitudinal axis 5, thereby defining the slot 16 down the middle of the frame between the ends of the teeth. The width of the slot 16 may be uniform over the length of the frame, or variable.

Figure 2:
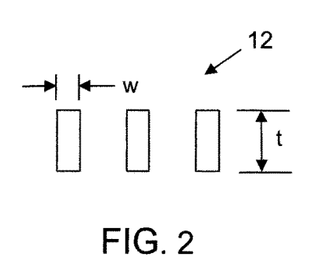
FIG. 2 is a cross section of the frame portion of the slot expanding energy attenuator showing the shape of the comb teeth.

Referring now also to FIG. 2, the teeth may be rectangular in profile, defined by a tooth width 'w' in a direction corresponding to the plane of FIG. 1, and a tooth thickness 't' measured perpendicular to the plane of frame. The thickness 't' may be the same as the thickness of the entire frame, for example if the teeth and frame are fabricated from a single piece of uniform thickness plate stock. The teeth may also be tapered as shown, decreasing in width 'w' with distance from the inside edges of the frame toward the center axis 5. In any case, the tooth thickness 't' is everywhere equal to or greater than the tooth width 'w'. In one embodiment tooth thickness is at least twice the maximum tooth width, and in another particular embodiment the tooth thickness is about three times the maximum tooth width.

The frame and teeth may be any metal capable of substantial plastic deformation without rupturing, such as for example brass, stainless steel, or various aluminum alloys. The frame may be fabricated using various known means, such as casting, forging, machining, or additive manufacturing. In one embodiment the frame is made from plate stock, with the left and right comb structures formed by removing material from the plate, such as by milling, laser, or water jet cutting. The frame may include mounting holes 15 or other attachment means for securing the frame to a first structure or body.

Figure 3:
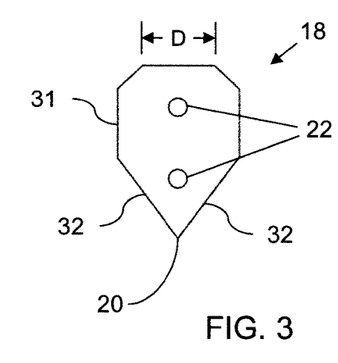
FIG. 3 is a plan view of an exemplary mandrel with a body portion, and a wedge shaped leading edge.

The EA mechanism further includes a mandrel 18 that is separate and independent from frame 2. The mandrel is initially positioned inside and co-planar with the frame, centered on longitudinal axis 5, and may be adjacent the inside edge 11 of the frame upper end 3. Referring to FIG. 3, the mandrel may have a body portion 31, and a leading edge 32, with the body portion defining a maximum width 'D' that is substantially greater than the width of the slot 16 between the two combs.

The leading edge 32 may be wedge shaped as shown, coming to an apex 20 at the center. Alternatively, the leading edge may present a curved or arcuate shape, or a combination of curved and straight portions. In one alternative embodiment the mandrel is circular in shape, such as a section of a circular rod, in which case any exterior segment may serve as a leading edge. The mandrel may have a thickness as measured in a direction perpendicular to the plane of FIG. 3 and FIG. 1 that is approximately equal to, or greater than the thickness 't' of teeth 12. The mandrel may thus be positioned to ensure contact with entire thickness of the teeth.

In FIG. 1 the mandrel is shown in a starting position proximate the upper end of the frame where it is trapped in a cavity defined by the inside edge 11 of the frame, and one or more pairs of truncated teeth 17. The truncated teeth may be configured to closely parallel or abut the leading edge surfaces of the mandrel as shown, thereby keeping the mandrel centered and aligned with slot 16, as well as trapped against the inside of the frame. The mandrel may have one or more attachment features such as a flange or the mounting holes 22 shown (see FIG. 3) for securing the mandrel to a second structure or mass.

Figure 4:
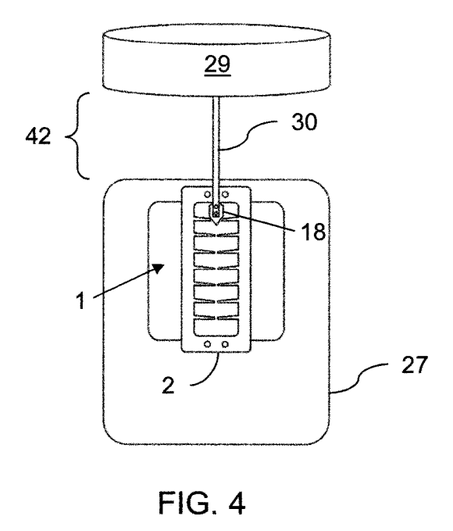
FIG. 4 is a schematic representation illustrating use of the energy attenuator in conjunction with a body attached to a structure through the energy attenuator.

Referring now to FIG. 4, the EA mechanism 1 in operation forms part of a load path between a mobile structure 27, and a body 29 supported by the mobile structure. The mobile structure 27 may be a vehicle, aircraft, watercraft, spacecraft, or other machine or construction exposed to external forces during normal use, and potentially very high external forces in certain extreme or catastrophic circumstances. In one exemplary embodiment the structure 27 is a vehicle, and the body 29 is a seat configured to displace, or stroke relative to the vehicle under extreme loading conditions. Acceleration of the mobile structure, such as that caused by an explosion occurring adjacent to or under a vehicle, will result in an inertia force as the body reacts to the acceleration imparted to it by the structure, and is itself accelerated. Because the EA mechanism is in the load path, the acceleration induced inertia force between the body and structure is realized as a reaction load at the EA mechanism.

The EA mechanism is configured to limit the maximum acceleration experienced by the body when the structure is subjected to a such a high energy, explosive, or otherwise catastrophic external structure loading event, referred to herein interchangeably as a "high energy impact event", or "impact event", or "high energy event". Such an event is further intended to mean generally one with enough energy to accelerate the structure at a rate sufficient to produce a body acceleration that is substantially above an allowable level. Such impact events are typically described and defined in terms of an acceleration profile that goes from zero to a peak and back to zero within a matter of milliseconds, in which the peak acceleration value is much greater than any allowable human acceleration level, and typically more than twice the defined allowable. With respect to the present invention, the practical effect is a near instantaneous step increase in the structure to body closing velocity from zero to some peak value. In the case of an under-vehicle explosion event for example, the vehicle (structure) is nearly instantaneously accelerated upward toward the seat (body) to a peak velocity, delivering the acceleration impulse to the seating system. Typical peak instantaneous closing velocities during such impact events may be in a range of about 150 to 400 inches per second. The EA mechanism acts to spread the resulting acceleration of the body over a much larger time interval and distance than that experienced by the impacted structure.

Continuing with FIG. 4, the frame 2 of the EA mechanism is connected to the mobile structurer 27, and the mandrel 18 is connected to the supported body 29. A guide 30 constrains the mandrel and body to move only along the direction of axis 5, and prevents the mandrel from moving out of the plane of frame 2. The arrangement of FIG. 4 is purely arbitrary however, and may be altered depending upon the constraints of a particular application without changing the scope or content of the invention. Specifically, the frame 2 could instead be mounted to the body 29, and the mandrel 18 connected to the mobile structure 27, with guide 30 again ensuring only axial, in-plane movement.

In either case, weight or inertia force between the body and the structure in the direction of axis 5 is realized within the EA mechanism as a reaction force in the direction of axis 5 between the mandrel and frame, and thus relative motion between the mobile structure 27 and body 29 in the direction of axis 5 requires motion of the mandrel relative to the frame. However, such motion is effectively blocked by the rows of teeth forming slot 16. Motion of the mandrel along the slot, and consequently motion of the body 29 relative to the structure 27 along axis 5, can therefore only occur if the mandrel is pushed hard enough to force its way down into slot 16 between the left and right halves of the frame.

In one embodiment the teeth, and/or the frame sides are configured to remain substantially rigid and prevent any permanent relative movement between the structure and body so long as the magnitude of a reaction load between structure and body is less than a predetermined threshold load value. However if the threshold load is reached, such as may occur in an explosive impact event, the teeth and/or frame sides are configured to plastically deform and bend out of the way under the resulting mandrel force, allowing the mandrel to forcibly advance down the slot 16. As long as the threshold load is maintained, the mandrel will continue to steadily and predictably advance down slot 16 in this manner, attenuating energy along the way, and allowing the body and structure to displace relative to one another, or stroke.

Figure 5:
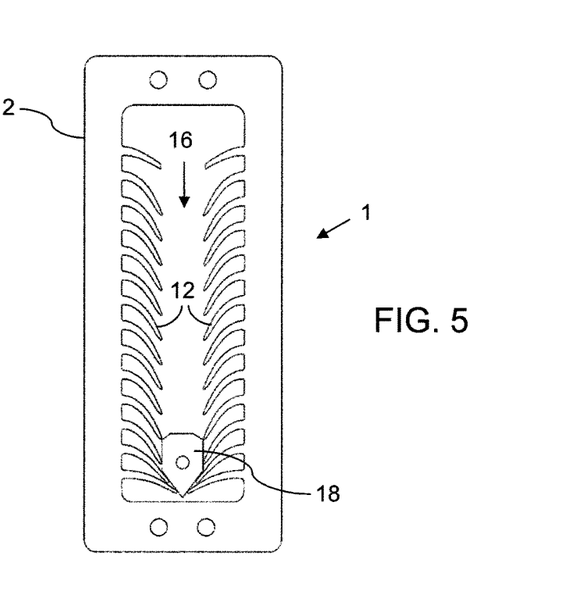
FIG. 5 is a plan view of the expanding slot energy attenuator of FIG. 1 after a high energy impact event causing the mandrel to traverse the entire length of the frame slot.

FIG. 5 depicts the end result of reaching and then maintaining the threshold load continuously until the mandrel has advanced the full length of the frame. The mandrel is at the bottom of the frame, and all of the teeth on both sides of the frame have been permanently deformed downward and outward in the wake of the passing mandrel. As discussed further below, the condition of FIG. 5 may the end result of a single impact event, or the end result of a second event occurring after a first event and subsequent body position reset.

The threshold load is selected based on the maximum acceleration, sometimes expressed as a number of G's, that can be safely experienced by the body, or experienced without causing unacceptable damage or injury. For example, in a vehicle seat application in which the seat is configured to stroke relative to the vehicle during a blast or impact event, the threshold load may be based on a maximum allowable acceleration of the seat. In other words, the magnitude of the associated threshold load may be selected so as to ensure the acceleration experienced by a seated occupant having a body weight within a specified range does not exceed the allowable number of G's. Accordingly in such cases the threshold load is dependent upon the anticipated weight or weight range of the occupied seat.

The threshold load is determined by the specific mechanical configuration of the EA mechanism. Design parameters affecting the mechanical response of the EA mechanism to an applied load may include the frame and teeth material, frame length, number of teeth, length and cross-sectional area of the frame sides, length and cross-sectional area of the teeth, tooth spacing, tooth taper, shape of the mandrel, relative width of the mandrel to slot 16, and other factors. In one embodiment the design parameters are chosen to result in the onset of permanent (or plastic) gross deformation of the teeth and/or frame occurring when the threshold load is reached.

Figure 6:
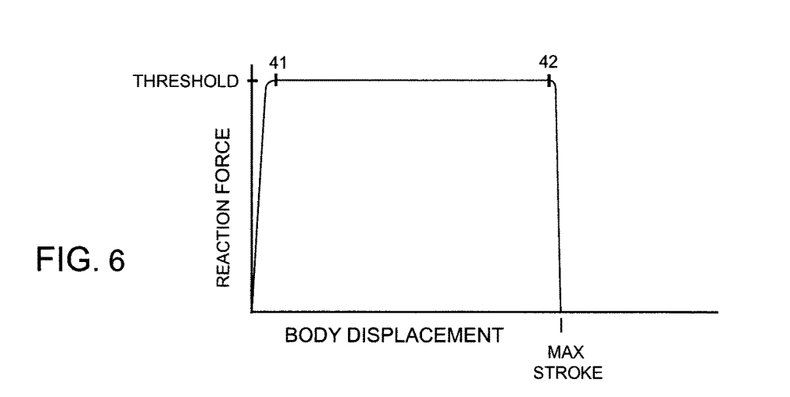
FIG. 6 is a load versus displacement plot showing an exemplary profile of a reaction force between a moveable structure and a body supported by the structure through the slot expanding energy attenuator.

FIG. 6 is an exemplary plot showing EA mechanism reaction force versus relative body displacement during an impact event in which the load path goes through the EA mechanism 1. At the onset of the event, the EA mechanism reaction load quickly ramps up over a relatively short distance as the structure is accelerated by the initial energy impulse, and the body is accelerated by the structure. Upon reaching the threshold load value, indicated at reference numeral 41, bending stresses in the teeth 12 from the advancing mandrel leading edge surpass the material yield strength, producing gross cross-section yielding. The ensuing plastic deformation of successive teeth prevents the load from increasing further, and will continue for as long as the remaining event energy is sufficient to maintain the threshold load. If there is enough physical space, or stroke length 42 (see FIG. 4) between the body and the structure to reach the point at which the event energy drops below that point, deformation of the teeth rows will stop while at the same time motion of the body relative to the structure (or closing velocity) reaches zero. Such an end point is indicated on the right side of FIG. 6 at reference numeral 42, with the EA reaction load immediately going to zero in a relatively very short distance.

The ratio of the area under the exemplary force-displacement curve of FIG. 6 to the product of total displacement and peak force is one measure of the energy absorption efficiency of the system. According to this method, the most energy efficient system is one in which the force quickly ramps up to a peak, and remains at that peak value for as much of the available stroke as possible. EA devices configured to optimize efficiency in this manner are known as fixed load energy absorbers, or "FLEA".

If the event energy is absorbed in less than the available stroke, efficiency is lost, resulting in higher than necessary G loading of the body. Conversely, if event energy is not exhausted in the available stroke length, the body can bottom out against the structure, causing the body acceleration to spike and exceed allowable levels. To minimize such loss of efficiency and load spikes, the EA mechanism may be configured to perform optimally for a certain body weight, or range of body weights.

In the vehicle application for example, the EA mechanism may be configured to perform at an adequate level of efficiency for seat occupants that fall within a specified weight range, or within a specified percentile range for a fully loaded soldier as specified in various military standards. Achieving the desired efficiency may be achieved by selectively combining the previously mentioned design elements of the EA mechanism, such as the frame and teeth material, frame length, tooth spacing, etc., to produce a desired threshold load. Moreover, the EA mechanism may be configured such that one or more of the design elements may be changed or adjusted in order to optimize efficiency for a particular seat loading condition, or range of conditions.

For example, the EA mechanism may include a manual adjustment feature for changing the width 'D' of the mandrel, such as a pair of threaded rods, or any other suitable mechanism for spreading or contracting the mandrel. The threshold load may then be increased or decreased by using the adjustment feature to simply increase or decrease the width of the adjustable mandrel.

Alternatively, the EA mechanism may include an adjustment feature for changing the width of the slot 16 through which the mandrel passes during an impact event. For example, instead of being one piece as shown, the left and right halves of the frame could be separate pieces configured to be moveable toward or away from each other. The configuration may include ratchets, clamps, or other such devices capable of simply and positively locking the frame halves in a position giving the desired slot width.

In another embodiment the frame may be configured to produce a threshold load that varies in a predefined manner over the useable range to define a non-constant threshold load profile. Such systems are sometimes referred to as "fixed profile energy attenuating", or FPEA, as contrasted with the constant load, or FLEA embodiment previously mentioned. In certain applications fixed profile attenuation can be utilized to achieve greater energy absorption efficiency than is possible by using a constant load FLEA system.

In the present system, the frame may be configured to produce a fixed profile threshold load by varying certain mechanical or geometrical properties of the frame in the longitudinal direction. Such properties may include the width of the slot, the shape or width of the left and right frame halves, width and thickness of the teeth, amount of tooth taper, and tooth spacing. The variations may be configured to produce step changes in the load, or gradual changes over one or more defined portions of the useable range. In one embodiment the EA mechanism is configured to produce a type of FPEA known as a "notched-load profile", characterized by an initial load spike, followed by a brief reduced magnitude "notch" load, that then transitions to higher fixed (or "hold") load for the remainder or majority of the useable range.

The EA mechanism may be further configured to passively or actively sense the static weight of the body 29, and automatically adjust any of the above mentioned parameters affecting the threshold load. Those skilled in the art will appreciate that various other adjustment concepts or combinations thereof may be employed to produce a desired change in the threshold load of the EA mechanism, and are considered foreseeable alternatives within the scope of the present invention.

The EA mechanism may be further configured to attenuate the energy of two sequential impact events. In this type of configuration the EA mechanism resets itself after the first impact event for subsequently attenuating the energy of the second event. The ability to reset in this manner is desirable for example in certain vehicle applications, and in particular vehicles exposed to the threat of an under-vehicle explosion such as from a mine or improvised explosive device (or IED).

Vehicles subjected to under-vehicle explosions can experience two sequential impact events in some circumstances, with the first event being the initial explosion. If the energy impulse imparted to the vehicle from the explosion is large enough, the vehicle can be lifted off the ground to a substantial height. The second impact event, known as "slam down", occurs when the vehicle comes back to the ground. If the entire energy absorption capability of the EA mechanism is exhausted in the first impact event, then the body, or vehicle seat occupant, will be unprotected at slam down.

To attenuate the energy of two sequential events, EA mechanism 1 may be configured to have a total, or useful deformation range that is large enough to accommodate the maximum available body displacement in both events. The useful deformation range may be the total distance traveled by the mandrel from the starting position of FIG. 1 to the end position of FIG. 5. In this embodiment, a first portion of the useful deformation range is used in the first impact event, and a second portion of the useful deformation range is used in the second impact event, where the total of the first and second portions does not exceed the useful deformation range.

During a first impact event, the position of the body relative to the structure changes as the body strokes from a body starting position at which there has been no deformation of the frame teeth, to a body ending position at which a first portion of the frame teeth have been deformed by the mandrel. If at the body ending position all of the available body stroking space has been used, the body must first be repositioned relative to the EA mechanism in the direction of the body starting position in order to then utilize another portion of the useful frame deformation range. For this repositioning to occur, the EA mechanism must be configured to allow the body to move between impact events in the direction of the body starting position.

Figure 7:
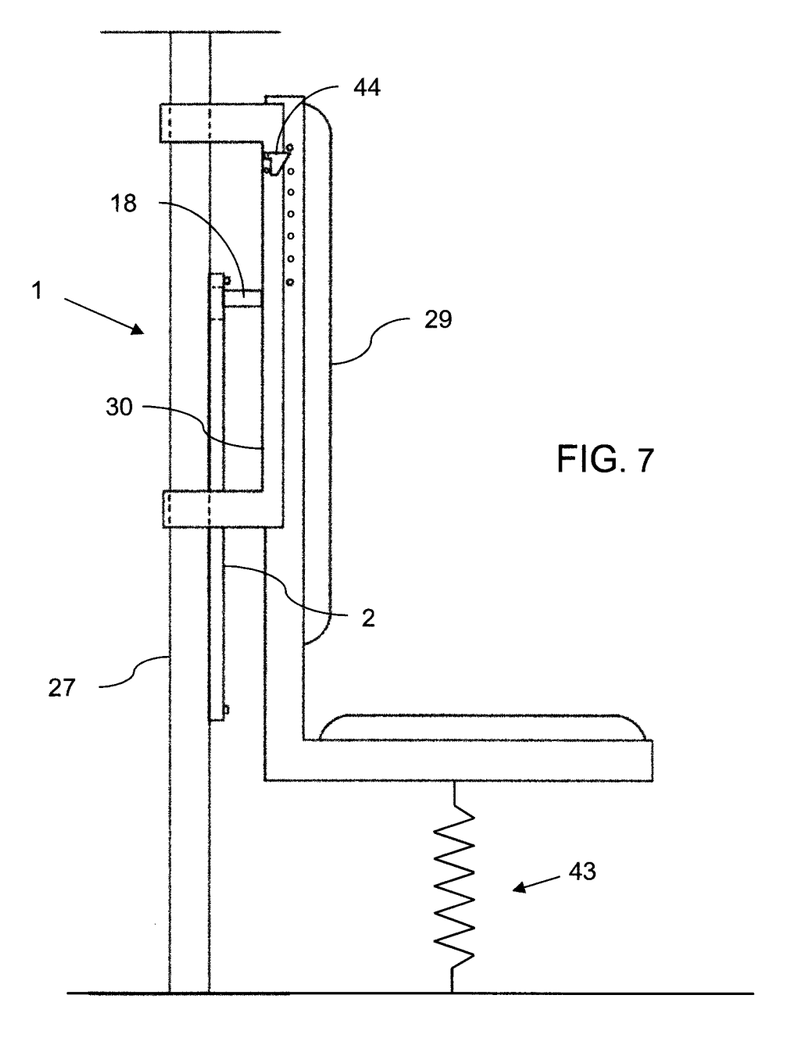
FIG. 7 is a side view of a vehicle seat guided to a fixed column, and supported through the slot expanding energy attenuator.

Such one-way freedom of motion may be obtained, for example, using a directional ratchet or catch device that prevents motion of the body relative to the EA mechanism in one direction. FIG. 7 illustrates one example in which a body 29 (in the form of a vehicle seat) is slidably attached to a moveable guide 30 that is in turn attached to the moving element of the EA mechanism, and slidably connected to the mobile structure 27. The moving element of the EA mechanism may be whichever one of the mandrel and frame that is not attached to the mobile structure 27. In this embodiment the moving element is the mandrel 18, and the frame 2 of the EA mechanism is attached to the mobile structure 27, which in this example is in the form of a fixed column or seat frame inside a vehicle.

A catch 44 is attached to guide 30 and configured so that movement of the body 29 from the starting position toward the ending position, also referred to herein as the body stroking direction, and downward looking at FIG. 7, causes the device to lock, preventing the body from moving relative to the mandrel. Thus, the body can only move in the body stroking direction by applying a force to the EA mechanism equaling the threshold load, and forcing the mandrel down the frame. However when the body tries to move in the opposite direction, that is, from the ending position toward the starting position, also referred to herein as the body reset direction, or upward looking at FIG. 7, the catch 44 releases, allowing the body to move unhindered by the EA mechanism.

Because the catch mechanism is configured to always lock in the body stroking direction, any displacement of the body in the reset direction back toward the starting position is effectively locked in, re-establishing space for the body to stroke in a second impact event. Thus the EA mechanism effectively resets when the body moves back toward the starting position after a first impact event. Optimally the body will completely reset by moving in the body reset direction back to the starting position, so that the entire available body stroking space may be used again in a second impact event.

The depicted catch device is only one of many possible ways to accomplish reset of the body relative to the EA mechanism and structure. In general, the ability to reset may be achieved using any type of mechanism or interface that allows guided one-way movement only between the body and the portion of the EA mechanism that moves with the body during an impact event, whether that is the frame or the mandrel.

In certain applications the body can be expected to spontaneously reverse direction after the first impact event, and reposition itself to a starting position. For example, in the case of an under-vehicle explosion event with a seat configured to stroke toward the vehicle floor, the dynamics of the first impact event are generally such that the seat tends to rebound back toward the starting position, or away from the floor. Rebound can in fact be excessive in some circumstances, creating an intermediate impact, or "slam up", when the seat reaches the top of the stroking space.

However in other cases, depending upon the particular application and type of impact event, the body 29 may not completely reposition itself after the first impact. Physical circumstances may dictate that the body will not return to the starting position on its own, and in such applications it may be necessary to urge the body back to the starting position between a first and second impact event.

An example of a passive system for urging the body back toward the starting position is shown in FIG. 7. The system comprises a compression return spring 43 disposed between the body 29 and the structure 27. The spring is configured to compress during a first impact event as the body strokes in the direction indicated by the "down" arrow, from a starting position to an ending position. The spring force developed may be many times less than the inertia forces present during the impact event so as not to interfere with energy attenuation by the EA mechanism. After the first impact event when the inertia force has dissipated, the compressed spring will tend to expand and push the body up and back toward the starting position. The spring could alternatively be configured to extend instead of compress when the body strokes, and then pull the body back toward the starting position between events.

FIGS. 8A through 8D illustrate a double impact sequence event involving an intermediate reset, with the body 29 and mobile structure 27 represented by the seat and column embodiment of FIG. 7. Specifically, the sliding guide 30 is attached to the mandrel 18 of the EA mechanism, and the body (seat) 29 is attached to the guide 30 with a sliding interface 47. The sliding interface incorporates a one-way feature, such as the depicted catch 44, that allows the seat to freely move upward relative to guide 30, and then lock when the seat tries to move downward. The frame 2 of the EA mechanism is attached to the mobile structure (column) 27 in this embodiment, and remains fixed throughout double impact event.

Figures 8A, 8B, 8C:
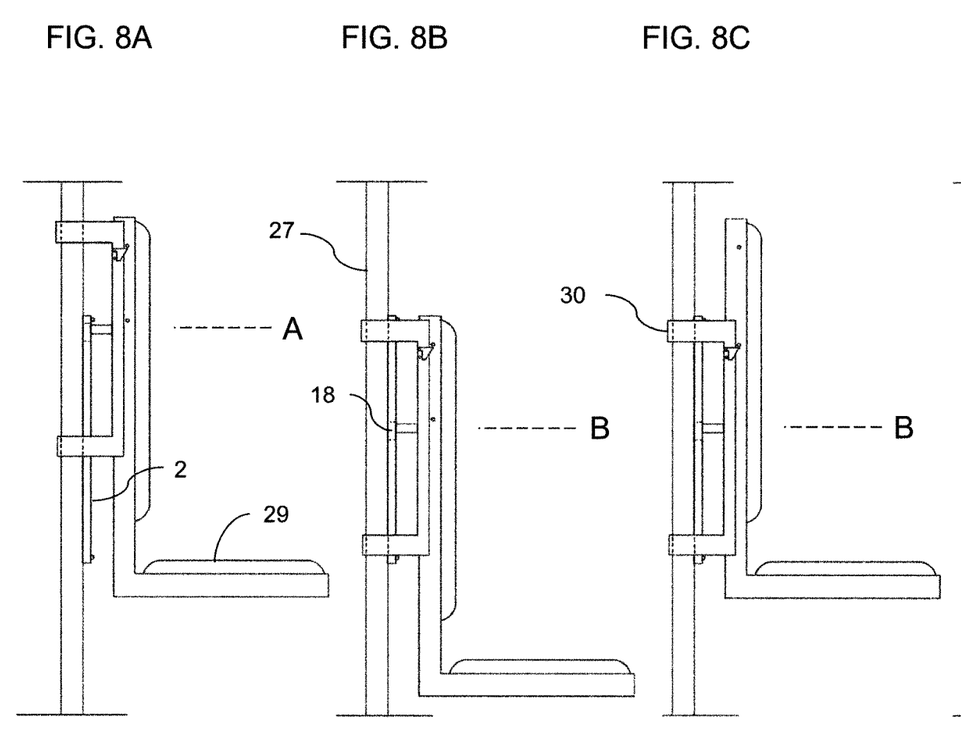
FIGS. 8A through 8D depicts the vehicle seat of FIG. 7 at the beginning and end of two sequential impact events.

FIGS. 8A and 8B depict the system before and after an initial impact event such as an under-vehicle explosion. In FIG. 8A, the mandrel 18 is in a starting position at the top of the frame as depicted in FIG. 1, with the vertical position of the mandrel indicated by dashed line A. The initial impact event causes the seat along with the guide 30 and mandrel, to stroke downward to the position illustrated by FIG. 8B. During this initial stroke the mandrel traverses a first portion of the useable range of frame 2 extending from the starting position at line A to an intermediate position indicated at dashed line B, deforming the frame teeth and attenuating event energy in the process. The teeth in the traversed portion of the frame may be permanently deformed and pushed out of the way creating a wide path in the wake of the mandrel as depicted in FIG. 5, with the rest of the teeth in the portion of the frame below the mandrel still undeformed as depicted in FIG. 1. In a preferred embodiment the EA mechanism is configured such that the energy of the initial impact event is completely attenuated just as the body reaches the end of its available stroking range.

Following the initial stroke, the seat resets by reversing direction and moving upward relative to the EA mechanism and structure 27 to the position shown in FIG. 8C, reestablishing the full available seat stroking range. As discussed above, this upward resetting motion may occur spontaneously due to a rebound effect, or with assistance such as via the passive spring system shown in FIG. 7. The seat is automatically locked in the raised, reset position of FIG. 8C by the one-way feature of the sliding interface 47.

Figure 8D:
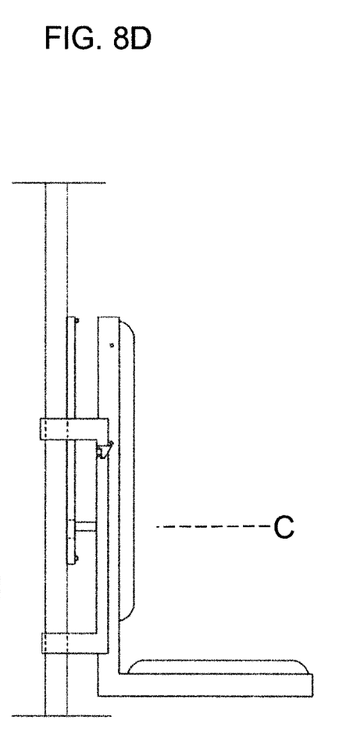

The second impact, or 'slam down', causes the seat along with the guide 30 and mandrel, to again stroke downward the full available seat stroking range to the position illustrated by FIG. 8D. During this second stroke the mandrel traverses a second, remaining portion of the useable range of frame 2 extending from the intermediate position at line B to a final position indicated at dashed line C, deforming the remaining frame teeth and attenuating the second impact event energy in the process. At this point all of the frame teeth may be permanently deformed and pushed out of the way creating a wide path the full length of the frame with the mandrel resting at the very lower end of the frame, as depicted in FIG. 5.

In a double impact system, the first and second portions of the useable range of the frame may be configured identically, or configured to produce different threshold loads or load profiles. For example, in one embodiment the first portion is configured to produce a constant threshold load, and the second portion is configured to produce a threshold load defined by a non-constant load profile. Further, although a double impact event has been specifically discussed it should be appreciated that the EA mechanism may be configured to attenuate more than two sequential impacts by increasing the length of the frame and combs as required. Moreover, many other alternatives or variations on the resetting embodiments disclosed herein are possible, and considered to be within the scope of the present invention.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under § 112, 6th paragraph is not intended. Additionally, it is not intended that the scope of patent protection afforded the present invention be defined by reading into any claim a limitation found herein that does not explicitly appear in the claim itself.

What is claimed is:

1. A shock attenuation device configured to operate between a structure and a body that is supported by and moveable relative to the structure along a stroking direction, the shock attenuation device comprising:

an elongated metal frame with upper and lower ends, left and right sides, and a thickness in a direction perpendicular to a major plane defined by the frame ends and sides, the frame divided into symmetrical left and right halves by a longitudinal axis extending through the upper and lower ends, wherein the frame is mountable to one of the body and structure with the longitudinal axis aligned with the body stroking direction;

left and right rows of substantially uniform cantilevered elongated teeth, the teeth extending from inside edges of frame sides toward the longitudinal axis, each tooth having a length dimension measured from the inside edge of the frame side to a free end of the tooth, a width dimension in a direction parallel to the frame longitudinal axis, and a thickness dimension corresponding in direction to the frame thickness, wherein the length of each tooth is less than the distance from the inside edges of the frame sides to the longitudinal axis, thereby defining an open slot with a defined slot width along the center of the frame between the rows of teeth; and a mandrel mountable to the other one of the body and structure, configured to fit in the frame at a starting position proximate at an upper end of the rows of teeth, the mandrel having width and length dimensions measured in the plane of the frame, wherein a maximum width of the mandrel is greater than the slot width.

2. The shock attenuation device of claim 1, wherein the thickness of each tooth is substantially greater than the width, and the length of each tooth is substantially greater than the thickness.

3. The shock attenuation device of claim 2, wherein the thickness of each tooth is at least twice a maximum width of the tooth, and the length of each tooth is at least three times the maximum thickness.

4. The shock attenuation device of claim 1, wherein the mandrel has a body portion and a leading edge, the leading edge centered on the slot between the rows of teeth and facing the lower end of the frame.

5. The shock attenuation device of claim 4, wherein the leading edge of the mandrel is wedge shaped.

6. The shock attenuation device of claim 1, wherein the frame is defined by a rectangular outside edge.

7. The shock attenuation device of claim 6, wherein the frame and teeth have one uniform thickness.

8. The shock attenuation device of claim 1, further comprising a guide configured to constrain the body to move relative to the structure only along a path parallel to the stroking direction.

9. The shock attenuation device of claim 8, further comprising a one-way interface configured to catch and cause the one of the frame and mandrel that is mountable to the body to move with the body when the body moves in the stroking direction, and to release and allow the one of the frame and mandrel that is mountable to the body to remain stationary relative to the structure when the body moves in an opposite direction.

10. The shock attenuation device of claim 1, wherein the frame is configured to remain rigid and prevent the body from moving relative to the structure as long as the magnitude of a body inertia force in the stroking direction is less than a predetermined threshold value, and to plastically deform in a progressive, predictable manner as the mandrel moves from the starting position toward the lower end of the frame in response to a body inertia force in the stroking direction equaling the threshold value, thereby allowing the body to displace in the stroking direction.

11. The shock attenuation device of claim 10, wherein the frame is configured to produce a fixed profile threshold load that varies in a predefined manner with longitudinal position of the mandrel.

12. The shock attenuation device of claim 11, wherein the fixed profile threshold load is achieved by selectively varying frame properties in the group comprising: the width of the slot, shape of the left and right frame sides, tooth thickness, tooth width, tooth spacing, and amount of tooth taper.

13. The shock attenuation device of claim 1, further comprising an adjustment mechanism for changing the width of the mandrel.

14. The shock attenuation device of claim 1, further comprising an adjustment mechanism for changing the width of the slot.

15. The device of claim 1, wherein the structure is a vehicle, and the body supported by the structure is a seat.

16. The device of claim 1, wherein the frame and teeth are aluminum, and the mandrel is steel.

17. The device of claim 16, wherein each tooth in the left row of teeth aligns with a tooth in the right row of teeth, and wherein the width of each tooth tapers toward the free end.

18. A shock attenuation device configured for use in conjunction with a vehicle seat moveably mounted in a vehicle along a stroking direction to attenuate shock loads associated with a high energy impact event, the shock attenuation device comprising:
   an elongated metal frame with left and right sides symmetrically disposed about a longitudinal frame axis, and a thickness in a direction perpendicular to a major plane defined by the frame sides, wherein the frame is mountable to one of the seat and vehicle with the longitudinal axis aligned with the seat stroking direction;
   left and right rows of substantially uniform cantilevered elongated teeth extending from inside edges of the left and right frame sides toward the longitudinal axis, each tooth having a length dimension measured from the inside edge of the frame side to a free end of the tooth, a width dimension in a direction parallel to the frame longitudinal axis, and a thickness dimension corresponding in direction to the frame thickness, wherein the length of each tooth is less than the distance from the inside edges of the frame sides to the longitudinal axis, thereby defining an open slot with a defined slot width between the rows of teeth; and
   a mandrel mountable to the other one of the seat and vehicle, configured to fit in the frame at a starting position proximate one end of the rows of teeth, the mandrel having width and length dimensions measured in the plane of the frame, wherein a maximum width of the mandrel is greater than the slot width.

19. The shock attenuation device of claim 18, wherein the rows of teeth are configured to remain rigid and prevent the seat from moving relative to the vehicle as long as the magnitude of a seat inertia force in the stroking direction is less than a predetermined threshold value, and to plastically deform in a progressive, predictable manner as the mandrel moves from the starting position toward the lower end of the frame in response to a seat inertia force in the stroking direction reaching the threshold value, thereby allowing the seat to displace in the stroking direction.

20. The shock attenuation device of claim 19, further comprising a guide configured to constrain the seat to move relative to the vehicle only along a path parallel to the stroking direction.

21. The shock attenuation device of claim 20, further comprising a one-way interface configured to catch and cause the one of the frame and mandrel that is mountable to the seat to move with the seat when the seat moves in the stroking direction, and to release and allow the one of the frame and mandrel that is mountable to the seat to remain stationary relative to the vehicle when the seat moves in an opposite direction.

22. A method for attenuating shock loads imparted to a body supported by a structure and constrained to move along a stroking direction relative to the structure when the structure is exposed to a high energy impact event accelerating the structure at a rate exceeding an allowable body acceleration level, the method comprising the steps of:
   mounting an elongated rigid frame to one of the body and structure, the frame having left and right sides symmetrically disposed about a longitudinal slot generally aligned with the stroking direction and extending from proximate a first end of the frame to a second end, and
   expanding the slot with a mandrel wider than the slot and attached to the other one of the body and structure, whereby an acceleration induced inertia load between the structure and the body tending to move the body in the stroking direction relative to the structure reaches a threshold value, forcing the mandrel into the slot and causing gross plastic deformation of the frame.

23. The method and claim 22, wherein the frame further comprises juxtaposed left and right rows of substantially uniform elongated cantilevered teeth extending generally perpendicularly from the left and right sides of the frame toward the longitudinal slot, and wherein the longitudinal slot is defined by a space between ends of the teeth.

24. The method of claim 23, wherein the impact event energy is sufficient to maintain the inertia force at the threshold value until the body has moved relative to the structure a defined stroking distance from a starting position to an end position, and the mandrel has traversed a first portion of a total useable range of the frame along the longitudinal slot.

25. The method of claim 24, wherein the frame is configured to produce a threshold load that varies in a predefined manner over the useable range of the frame.

26. The method of claim 24, further comprising the step of repositioning the body from the end position back to the starting position without moving the one of the mandrel and frame attached to the body.

27. The method of claim 26, wherein repositioning the body from the end position to the starting position is accomplished by physically urging the body toward the starting position.

28. The method of claim 27, further comprising the step of causing the body to move from starting position toward the ending position, and the mandrel to traverse a second portion of the total useable range of the frame under the influence of a second high energy impact event, wherein a combined length of the first and second portions of the useable range of the frame does not exceed the total useable range of the frame.

29. A shock attenuation device configured for use in conjunction with a body moveably mounted to a structure along a stroking direction to attenuate shock loads associated with a high energy impact event on the structure, the shock attenuation device comprising:
an elongated metal frame with left and right sides symmetrically disposed about a longitudinal slot extending from proximate a first end of the frame to a second end, and a thickness in a direction perpendicular to a major plane defined by the frame sides, wherein the frame is mountable to one of the body and structure in an orientation causing the longitudinal slot to align with the stroking direction; and
a mandrel mountable to the other one of the body and structure configured to fit in the frame at a starting position proximate one end of the slot, the mandrel having width and length dimensions measured in the plane of the frame, wherein a maximum width of the mandrel is greater than a width of the slot.

30. The shock attenuation device of claim 29, wherein the frame is configured to remain rigid and prevent the body from moving relative to the structure as long as the magnitude of a body inertia force in the stroking direction is less than a predetermined threshold value, and to plastically deform in a progressive, predictable manner as the mandrel traverses the slot from the starting position at the first end of the frame toward the second end of the frame in response to a body inertia force in the stroking direction equaling the threshold value, thereby allowing the body to displace in the stroking direction.

31. The shock attenuation device of claim 30, further comprising a guide configured to constrain the body to move relative to the structure only along a path parallel to the stroking direction.

32. The shock attenuation device of claim 31, further comprising a one-way interface configured to catch and cause the one of the frame and mandrel that is mountable to the body to move with the body when the body moves in the stroking direction, and to release and allow the one of the frame and mandrel that is mountable to the body to remain stationary relative to the structure when the body moves in an opposite direction.

33. The shock attenuation device of claim 29, further comprising left and right rows of substantially uniform cantilevered elongated teeth extending towards each other from inside edges of the left and right frame sides, each tooth having a length dimension measured from the inside edge of the frame side to a free end of the tooth, a width dimension in a direction parallel to the frame longitudinal axis, and a thickness dimension corresponding in direction to the frame thickness, wherein the slot is defined by a space between the free ends of the teeth in the left and right rows.

* * * * *